Sept. 23, 1930.  W. R. BREWER  1,776,677
COMPOUND DUPLEX DIFFERENTIAL
Filed Aug. 15, 1927  4 Sheets-Sheet 1

Inventor
William R. Brewer
By Howard Peele
Attorney

Sept. 23, 1930.  W. R. BREWER  1,776,677
COMPOUND DUPLEX DIFFERENTIAL
Filed Aug. 15, 1927    4 Sheets-Sheet 4

Inventor
William R. Brewer
By  Attorney

Patented Sept. 23, 1930

1,776,677

UNITED STATES PATENT OFFICE

WILLIAM R. BREWER, OF DULUTH, MINNESOTA

COMPOUND DUPLEX DIFFERENTIAL

Application filed August 15, 1927. Serial No. 212,855.

My invention relates to compound duplex differential for vehicles and which is particularly adapted to automobiles wherein it is designed to operate the driving axles of a motor vehicle in an efficient manner.

A feature of the invention resides in means of providing a differential drive having a balance so that the driving force is equally applied at either side of the axis of the driving axles and in such a manner as to equalize and balance the driving force in the differential providing an even wear on the parts and practically overcoming the back lashing action which is ordinarily apparent in different drives for motor vehicles.

The invention further includes the particular means of associating the parts together in a simple, practical manner so that the parts may be readily replaced and adjusted to permit them to operate most efficiently.

My invention includes a differential having a pair of driving gear members oppositely disposed centrally within the differential and connected with the driving shafts in a manner to drive the same through connecting gears operating from a countershaft which connects with the gears by driving pinions. The countershaft is adapted to be operated by the driving shaft of the motor vehicle and has spaced apart bearings within the differential casing, thus providing a very strong and substantial construction in my differential.

These features, together with other details and objects of the invention and the peculiar arrangement of the parts will be more clearly and fully set forth in the specification and claims.

In the drawings forming part of my specification:

Figure 1:
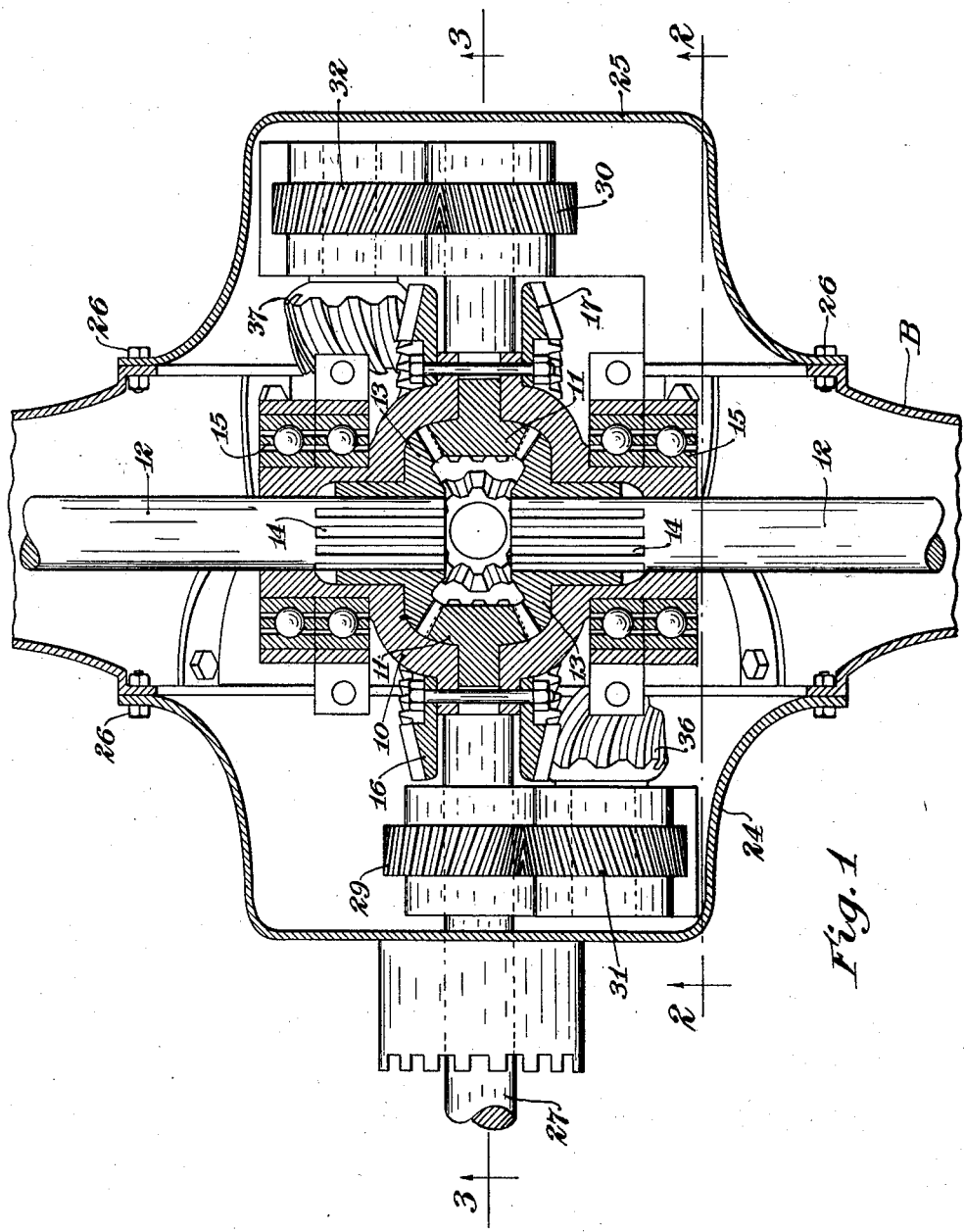
Figure 1 is a plan view of my compound duplex differential.

My differential A is adapted to be contained in the casing or housing B which is illustrated in the drawings as of an ordinary banjo type of casing or housing. I have illustrated in the drawings my differential A adapted and applied to the driving axles within the ordinary banjo type of casing and housing to show the simple manner in which the same can be adapted in a housing of this type.

My differential A is provided with the usual yoke member 10 which carries the differential pinions 11 and which is centrally positioned within the housing B between the ends of the drive shafts 12. The pinions 11 are adapted to mesh with the gears 13 which are keyed to the slotted end 14 of the shafts 12. This is of ordinary construction and the members of the yoke 10 fit together in a manner to hold the pinions 11 in position to mesh with the gears 13. The outer end of the yoke 10 extending over the shaft 12 is adapted to be supported by the ball-bearing journals 15. My differential A is provided with a pair of driving ring gears 16 and 17 which are adapted to be connected to the respective parts of the yoke 10 by suitable bolts such as 18, illustrated in Figure 2. Obviously the yoke 10 is divided centrally as illustrated in the back view in Figure 4 so that the parts of the same can be fitted together to contain and support the pinion differential gears 11. The gear 16 is attached to one side of the yoke 10 while the gear 17 is attached to the other side, and these gears are disposed with their gear faces oppositely to each other and with the backs of the gears toward each other.

Figure 2:
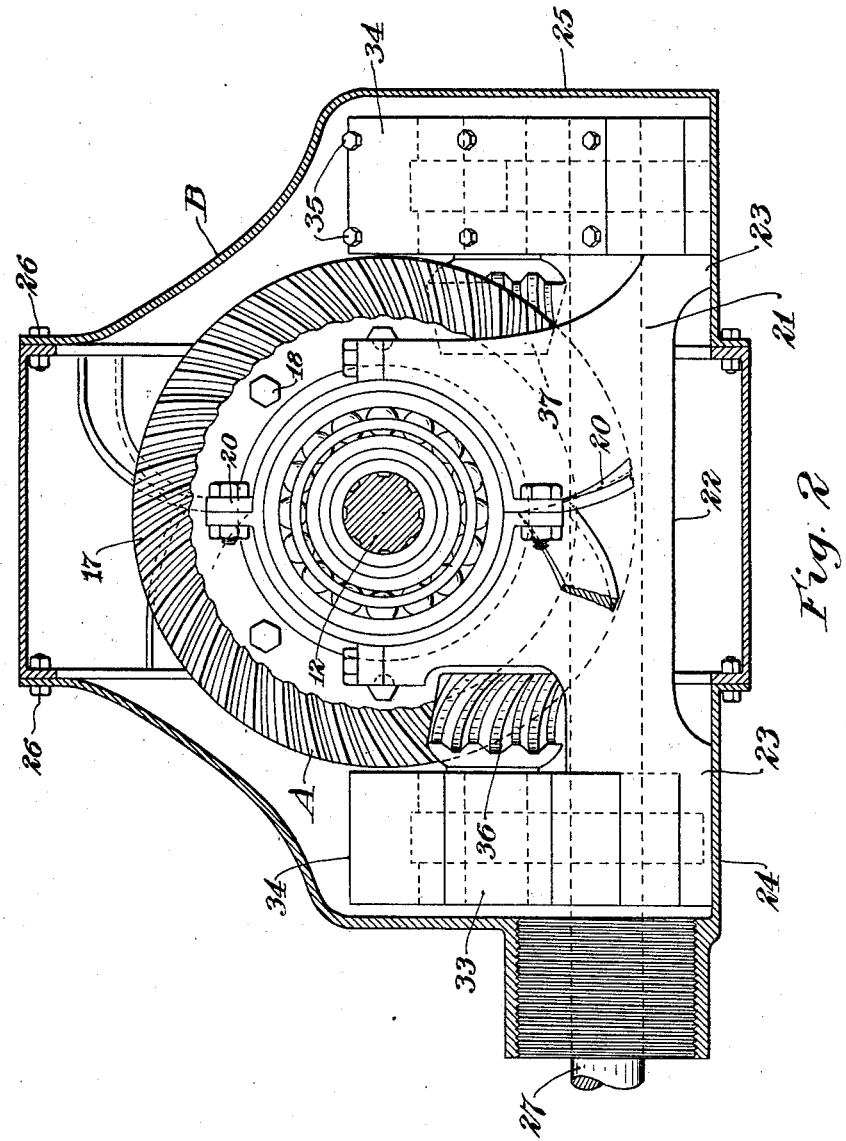
Figure 2 is a side view on the line 2—2 of Figure 1.
Figure 3:
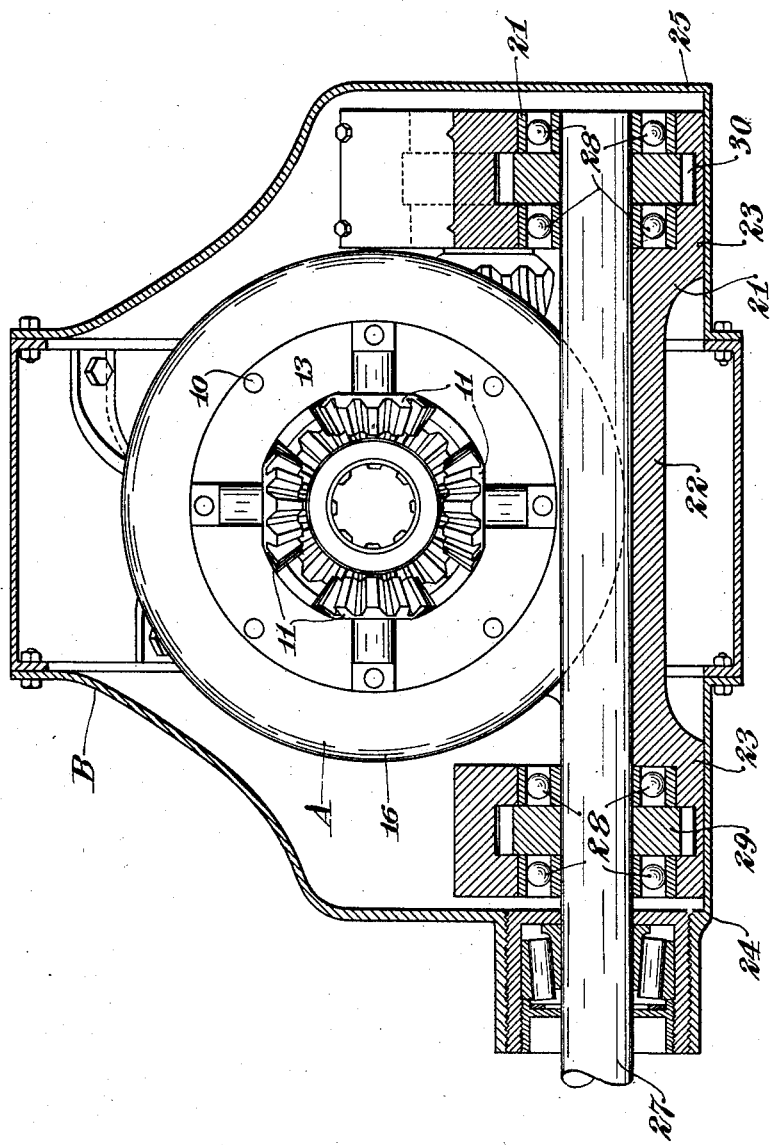
Figure 3 is a central cross section illustrating a side elevation of my differential on the line 3—3 of Figure 1.

The ball-bearing journals 15 are adapted to be supported by suitable brace members 20 to the inner surface of the housing B and by the skeleton frame 21 which extends upward from the bottom of the casing B. The skeleton supporting frame 21 extends on either side of the yoke 10 and outside of the driving gears 16 and 17 so as to support a portion of the bearings 15 from the bottom of the housing B, the center portion 22 of the suporting frame 21 being cut away as illustrated in Figure 3 and Figure 2, and the ends 23 of the frame resting in the projecting cover members 24 and 25. The cover member 24 being secured on the front of the banjo housing B and the cover member 25 being secured on the back of the same. These cover members are held by suitable bolts 26 in the ordinary manner.

The supporting frame 21 is adapted to receive a countershaft 27 which extends through the cover member 24 and which is adapted to be connected with the driving shaft of a motor vehicle in the ordinary and well known manner by a universal joint, which is not illustrated in the drawings, the countershaft 27 being just broken away at the front. The countershaft 27 extends below and between the gears 16 and 17 and to a position within the back cover 25. I provide suitable ball-bearings 28 supported by the frame 21 which are adapted to form suitable bearings for the shaft 27 so that the same may be operated freely in the supporting frame 21.

Figure 4:
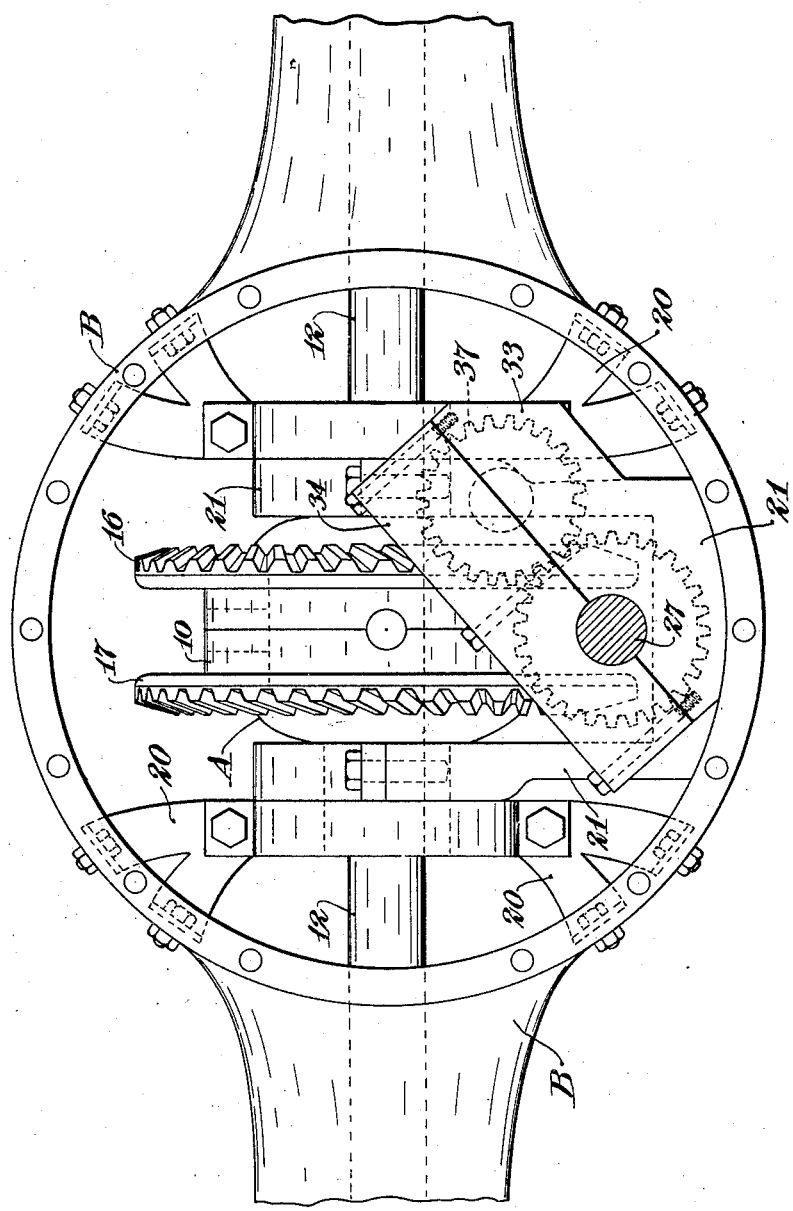
Figure 4 is a back view of my differential showing the back plate of the differential casing removed.

The countershaft 27 is provided with driving gears 29 and 30 which mesh with the gears 31 and 32. The gears 31 and 32 are adapted to be positioned at an angle from the driving gears 29 and 30 and the shaft 27, the gear 31 being positioned on one side of the shaft 27, while the gear 32 is positioned on the other side of the shaft as is illustrated in Figure 1. The supporting frame 21 is formed with an integral upwardly extending portion 33 on each end, one portion 33 extending to one side of the shaft 27 at one end, and the other upwardly extending portion 33 extending to the opposite side of the shaft 27. Thus the portions 33 form a support and balance for the shafts of the gears 31 and 32. I provide a suitable cover member 34 for the portion 33 of the frame 21 which is adapted to be held by the bolts 35 to hold the ends of the shaft 27 and to hold and inclose the gears 29 and 30 and 31 and 32. Figure 2 shows the relative side view of the ends 33 projecting upwardly from the frame 21 and the cover 34, while Figure 4 shows the end view of the frame 21 and the upwardly projecting portion 33 with the cover 34, the frame 21 being formed of a casting of a peculiar shape and nature to provide the projecting portion 33 which extends to either side of the shaft 27. Thus the gears 31 and 33 are held opposite from the countershaft 27 and are adapted to drive the pinions 36 and 37, the pinion 36 meshing with the gear 17, while the pinion 37 meshes with the gear 16. The countershaft 27 is aperated as described by the drive shaft of the motor vehicle and is adapted to operate the gears 29 and 30 which in turn rotate the gears 31 and 32, driving the pinions 36 and 37 to drive the gears 16 and 17 on the opposite sides of the yoke 10 and oppositely disposed to the longitudinal center of the drive shafts 12. In this manner the power from the driving shaft of the motor vehicle is transmitted through the counter driving shaft 27 and is equally distributed on either side of the differential yoke 10 through the pinions 36 and 37, and by means of the double or compound driving gears 16 and 17 the strain is equally distributed or balanced on either side of the drive shafts 12 and on both sides of the differential yoke 10 which carries the differential pinions 11 and the driving gears 13.

The contact of the pinions 36 and 37 with the ring gears 17 and 16, respectively, is at a point below the center or axis of the gears 16 and 17 and these intermeshing gears may be spirally cut so as to provide gear connections which are adapted to practically overcome the backlashing in the operation of the gears, and this is also materially effected by the double or compound duplex differential means in driving the shafts 12 through the countershaft 27 and the offset driving pinions 36 and 37.

When the back cover 25 is removed from the casing B, the relative position of the parts is illustrated in Figure 4. I have illustrated my duplex differential adapted to be inserted in the ordinary banjo type casing or housing B and showing a simple and effective manner in positioning the same therein without making any material changes in the casing B. The housing B rigidly supports the differential A in position and the cover members 24 and 25 are adapted to assist in supporting the countershaft of the same with the parts adjustable to each other and removable so that they can be readily replaced if it is desired.

My differential A is designed to distribute the load or driving force from the countershaft 27 to either side of the differential yoke 10 and the shafts 12, providing a compound duplex differential in which the load from the drive shaft 27 is equally distributed on each side of the differential gearing proper, balancing the force being directed to the drive shafts 12. The drive shafts 12 are the ordinary axle shafts which drive the driving wheels of a motor vehicle and only a portion of the same are illustrated in the drawings. By distributing the driving force to each side of the differential gearing in the yoke 10, I provide a means of equally balancing the parts of the differential A and in this manner together with the position of the driving pinions in relation to the driving gears 16 and 17, I practically overcome the backlashing and other disadvantages where the strain of the driving force is directed to one side of the differential and to one side of the drive shafts 12, thus eliminating wear and strain on the parts at a single point and equally distributing the same to the respective sides of the differential.

The drawings illustrate the differential A with the countershaft 27 extending along below the same, however, it is obvious that the position of the countershaft may be varied providing the principle of distributing the load to either side of the axis of the differential accomplishes a means of driving a vehicle with a divided axle such as 12 wherein the driving force is applied in a manner to be equally balanced and to overcome undesirable wear, and at the same time permitting a greater torque to be applied which is a very material advantage, particularly with high powered motor vehicle engines having a quick pickup and action which naturally throws a very heavy torque on the differential of the motor vehicle. The peculiar construction of my differential with a long driving countershaft member having bearings spaced apart in a manner to provide a rigidity of a desirble nature adds a material advantage in the operation of my differential.

In accordance with the patent statutes I have described the principles of operation of my compound duplex differential and while I have illustrated a particular arrangement and construction of parts, I desire to have it understood that the same is only suggestive of a means of carrying out my invention and that such construction and parts may be varied within the scope of the following claims without departing from the spirit of my invention.

I claim:

1. A differential including, differential gearing, a yoke for containing said gearing, gears secured to opposite sides of said yoke, and means to apply the drive force to each of said gears on opposite sides of a plane through the differential center and perpendicular to the drive shaft.

2. A differential including, differential gearing having a pair of driving gears adapted to be interposed in and connected with a driving axle, countershaft means, gearing spaced apart along the axis of said countershaft, means disposed on opposite sides of said differential gearing along the axis of the same to apply the driving force from said countershaft to each of said driving gears of said differential gearing.

3. A differential comprising, a differential gearing, a yoke for supporting said differential gearing, a pair of driving gears having their working faces oppositely disposed carried by said yoke, and means positioned on the opposite sides of the axis of said differential gearing adapted to engage said driving gears carried by said yoke at a point to one side of the axis of said differential gearing.

4. A differential for a motor vehicle including, a casing, a differential gearing supported within said casing, a yoke for supporting said differential gearing, a pair of gears carried by said yoke with the working faces thereof extending outward from the center of said yoke and on either side thereof, a countershaft supported in said casing, and a series of gears connecting said countershaft with said pair of gears carried by said yoke at points diagonally opposite and on either side of the axis of said differential gearing and driving gears.

5. A differential including, differential gearing including pinions supported radially about the axis of the driveshaft of said differential, gears carried by the axle meshing with said pinions, a housing for supporting said differential gearing, a pair of ring gears secured to either side of said housing with the working faces disposed in opposite directions to each other, driving pinions for said ring gears positioned to one side of the axis of said ring gears, a countershaft, and means for connecting said countershaft with said pinions to drive said ring gears.

6. A differential for a motor vehicle, driving axles positioned concentric in said differential, differential gearing interposed between the inner ends of said axle, a divided housing for inclosing and supporting said differential gearing, a pair of gears connected to either side of said housing, a countershaft extending between said gears and to one side of the axis of the same, and gear and pinion means connecting said countershaft at points diagonally opposite to said gears on said supporting housing.

7. A differential including, means adapted to provide differential gearing for a driving axle, driving gear means having a pair of driving faces, a pair of pinions adapted to connect with said driving faces at points to one side of a plane through the axle shafts parallel to the counter shaft, a countershaft, and gear means connecting said countershaft with said pinions.

8. A differential including, means for driving the same on either side of the axis thereof and at points offset from one another along said axis and extending in a plane to one side of the center of the differential.

9. A differential including, differential gearing, and duplex means for driving said differential gearing at points offset from one another along the drive shaft and extending in a plane to one side of the center of the differential.

10. A differential including, differential gearing, driving gears for operating said gearing, and means for driving said differential gearing adapted to engage said drive gearing at points offset from one another along the axis of said differential gearing on opposite sides of the same and radially less than 180 degrees apart on said driving gears.

11. A differential comprising, differential gearing interposed in the drive axle of a motor vehicle, a yoke for housing and supporting said differential gearing, a pair of driving gears having their working faces oppositely disposed carried by said yoke, a countershaft extending between said gears, driving gears carried by said countershaft, gears meshing with said gears on said counter driveshaft, and pinions operated by said gears in a manner to engage on the working faces of said driving gears carried by said yoke.

12. A differential including, a duplex driving means comprising a countershaft, a pair of pinions upon opposite sides of the differential gearing connecting said countershaft to operate said pair of pinions, and a pair of drive gears carried by the differential gearing meshing with said pinions, said pinions extending in a plane to one side of the geometric center of said differential and on opposite sides of a plane through the differential center and perpendicular to the counter shaft.

13. A differential including, a differential gearing and means for applying power at either side of the longitudinal axis of the driving axle of said differential gearing and at either side of the axis of said differential gearing, said means extending in a plane to one side of the center of said differential.

14. A differential including, differential gearing axially disposed in the driving axle of a motor vehicle, a pair of gear members carried by said differential on either side thereof, and countershaft and gear means adapted to engage said pair of gears on sides opposite to each other in a relation to the horizontal and vertical axis thereof.

WILLIAM R. BREWER.